United States Patent [19]

Doucet et al.

[11] Patent Number: 5,218,017
[45] Date of Patent: Jun. 8, 1993

[54] FLAME-RETARDED ABS FORMULATIONS WITH HIGH IMPACT STRENGTH

[75] Inventors: David K. Doucet; Janet F. Jones; Susan D. Landry; F. Alexander Pettigrew; Jon S. Reed; James E. Torres, all of Baton Rouge, La.

[73] Assignee: Ethyl Corporation, Richmond, Va.

[21] Appl. No.: 744,873

[22] Filed: Aug. 14, 1991

[51] Int. Cl.$^5$ ............... C08J 3/20; C08K 3/10; C08L 9/02
[52] U.S. Cl. ................... 523/351; 524/411; 524/430; 525/72; 525/148; 525/288
[58] Field of Search ............ 524/411, 430; 525/72, 525/148, 288; 523/351

[56] References Cited

U.S. PATENT DOCUMENTS

| | | | |
|---|---|---|---|
| 4,639,486 | 1/1987 | Liu | 524/409 |
| 4,751,260 | 6/1988 | Kress et al. | 524/130 |
| 5,036,126 | 7/1991 | Rinehart et al. | 524/141 |

Primary Examiner—Paul R. Michl
Assistant Examiner—U. K. Rajguru
Attorney, Agent, or Firm—E. E. Spielman, Jr.

[57] ABSTRACT

The impact strength of a flame retarded formulated ABS resin containing an impact modifier is increased by masterbatching the flame retardant and impact modifier.

20 Claims, No Drawings

FLAME-RETARDED ABS FORMULATIONS WITH HIGH IMPACT STRENGTH

This invention is in the field of thermoplastic synthetic resin formulations, especially ABS (acrylonitrile-butadiene-styrene) resins flame retarded with at least one brominated organic flame retardant, as well as a method for producing the formulations.

BACKGROUND

ABS resins are well known in the synthetic organic polymer art as a class of thermoplastics which offers excellent mechanical properties as well as good processability and chemical resistance. The general characteristics of ABS resins are described, for example, in "Modern Plastics Encyclopedia," McGraw-Hill, New York, N.Y., 1990, pp 90-91. ABS resins are co- or terpolymers which generally comprise a rigid styrene/acrylonitrile continuous phase in combination with a polybutadiene elastomer disperse phase. A graft copolymer in which small amounts of styrene and acrylonitrile are grafted onto butadiene chains may also be present to bridge the rigid phase and the elastomer phase and make them more compatible.

For purposes of the instant invention, an ABS resin is a thermoplastic, the chemical structure of which includes each of the following structural units, however combined:

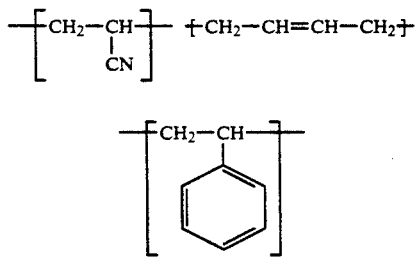

Further, a formulated ABS resin, for all purposes herein, comprises at least about 50 wt % ABS resin. The remainder of the formulated ABS resin comprises various monomeric or polymeric additives which modify the properties of the ABS resin. These additives include, for example, various impact modifiers, stabilizers, processing aids, pigments, flame retardants, synergists, etc. They can be incorporated into the ABS resin in various ways.

Incorporation of the various additives is not a trivial matter, and the properties of the formulated ABS resin can be affected by the manner in which it is done. When the additives are solids, dry-blending can be employed. For example, the solids can be mixed and heated to soften and homogenize the mass, which can then be sheeted, chopped, and pelletized.

A flame retardant, such as a halogenated organic compound, is often incorporated into a formulated ABS resin so as to constitute as much as about 25-30 wt % of the formulation. Such incorporation can adversely affect the properties, other than the flammability, of the formulated ABS resin.

SUMMARY OF THE INVENTION

Consequently, it is one object of this invention to provide a formulated ABS resin in which a halogenated organic flame retardant is incorporated and an impact modifying polymer is added so as to provide a significant net increase in the impact strength of the formulation. It is another objective to build on this improvement by providing a method for incorporating the flame retardant which leads to a still further increase in the impact strength.

In attaining the aforesaid objectives, this invention provides a flame retarded ABS formulation which comprises at least about 50 wt % ABS resin, about 5-30 wt % halogenated flame retardant, about 0-6 wt % flame retardant synergist, and about 8-38 wt % polymeric impact modifier. In preferred embodiments, the polymeric impact modifier is selected, and the flame retardant is incorporated in such a way that the Izod impact strength is dramatically increased.

DETAILED DESCRIPTION

The ABS resin component of the formulated ABS can be selected from the many resins available in commerce. Such resins include GE Cycolac ® resins, Monsanto Lustran ® resins, and Dow Magnum ® resins, for example. The ABS resin component of the formulated ABS resin of this invention comprises at least about 50 wt % of the formulation, and the ABS resin can comprise as much as about 70 wt % of the formulation.

One of the additives which will be present in the formulated ABS resin of this invention is one or more flame retardants, and halogenated flame retardants have been recommended and employed in that application. Halogenated flame retardants especially useful in the practice of this invention are selected from the group consisting of tetrahalobisphenol A, N,N'-bis(tetrahalophthalimide), ethylenebis(tetrahalophthalimide), halogenated polystyrene, and pentahalobenzyl acrylate, in all of which halo is selected from chloro and bromo, and also bis-halophenyl compounds represented by the following structural formula which are solids at ambient temperature:

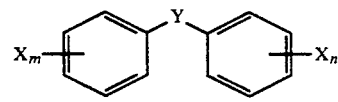

in which formula each X is selected independently from chlorine and bromine; m and n can be the same or different and can range from 1 to 5; Y is selected from oxygen, alkylene, —NR—(where R is selected from hydrogen and hydrocarbyl), alkylenedioxy, aryldioxy, and a chemical bond. Alkylene is preferably lower alkylene, i.e., straight chain or branched $C_1$-$C_6$, such as methylene, ethylene, isopropylene, butylene, t-butylene, and the like, methylene or ethylene being preferred. Hydrocarbyl includes alkylene, especially lower alkylene, but also unsaturated alkylene and aromatic groups such as phenyl and alkylphenyl or halophenyl. Alkylenedioxy includes methylenedioxy, 1,2-dioxyethylene, and the like, while aryldioxy includes dioxyphenyl, for example. In the preferred flame retardants halo and X are bromo. Among the aforesaid flame retardants, the bishalophenyl compounds are preferred, and among these compounds, decabromodiphenyl oxide, decabromodiphenyl ethane, 1,2-bis(tribromophenoxy)ethane, and decabromodiphenyl amine are especially attractive.

In addition to one or more halogenated flame retardants, the formulated ABS resin of this invention optionally includes a flame retardant synergist in an amount ranging from about 2 to about 6 wt %. A number of materials, such as metal oxides, e.g., iron oxide, tin oxide, zinc oxide, aluminum trioxide, alumina, antimony tri- and pentoxide, and boron compounds, e.g., zinc borate; also antimony silicates and ferrocene, are known to enhance the effectiveness of flame retardants, especially halogenated flame retardants. A particularly effective and preferred synergist is antimony trioxide.

In addition to flame retardant, the formulated ABS resin of this invention includes one or more polymeric impact modifiers. It is well known that the addition of certain materials to an ABS resin tends to toughen articles molded therefrom. Among these materials are styrene/butadiene/styrene triblock copolymer, styrene/isoprene/styrene triblock copolymer, styrene/butadiene diblock copolymer, polycaprolactone, functionalized ethylene/propylene copolymers, and poly(haloolefins). A preferred impact modifying material is a halogenated polyolefin resin, such as chlorinated polyethylene. A typical formulated ABS resin containing chlorinated polyethylene and a brominated flame retardant, in addition to the ABS resin, is described in Example 1.

EXAMPLE 1

A. The components indicated in column A, Table 1 were dry-blended by shaking them together for 2 min in a plastic bag. The mixture was then extruded on a Haake-Buchler System 40 Rheometer equipped with a twin-screw extruder head. The extrusion was carried out at 210°-210°-220°-220° C. and 60 rpm. The extruded material was pelletized and dried at 88° C. for 4 hr before injection molding it on a Battenfeld BSKM 100/40 machine at 195° C.

B. The components indicated in column B, Table 1 were combined as follows: The flame retardant, chlorinated polyethylene, processing aid, and one-half the stabilizer were blended in a Brabender mixer at 175° C. and 66 rpm for 2 min. The resultant blend was sheeted on a two-roll mill and chopped into small pieces on a Glouster grinder, affording a masterbatch. An amount of the masterblend appropriate to the desired composition was dry-blended with the remaining ingredients. The combination was then extruded, pelletized, dried, and molded as described in A above. The IZOD impact strength of the extruded materials was measured on $\frac{1}{8}$ in. test bars according to the ASTM D256 test method.

TABLE 1

| Component | A (wt %) | B (wt %) |
| --- | --- | --- |
| ABS Resin (Dow Magnum ® PG-914) | 69.9 | 68.9 |
| Impact Modifier; Polychloroethylene (Tyrin ® 3611 of Dow Chemical Co.) | 13.1 | 13.1$^a$ |
| Flame Retardant; Decabromodiphenyl Ethane (Ethyl Corp.) | 12.5 | 12.5$^a$ |
| Synergist; Sb$_2$O$_3$ | 4.0 | 4.0 |
| Processing Aid; Zinc Stearate | | 0.5$^a$ |
| Stabilizer; Dibutyltin Maleate (Thermolite ® 13 of Atochem No. Am.) | 0.5 | 1.0$^a$ |
| IZOD Impact Strength (ft-lb/in notch) | 3.6 ± 0.1 | 3.6 ± 0.1 |

$^a$component of masterbatch

The data in Example 1 show that master batching per se has little or no effect on impact strength of the resultant formulated ABS resin. The effect on IZOD impact strength of including a second impact modifying resin; more specifically, a styrene/butadiene/styrene block copolymer is set forth in Example 2.

EXAMPLE 2

A. The components indicated in column A, Table 2 were combined as explained in Example 1 A.

B. The components indicated in column B. Table 2 were combined as explained in Example 1 B.

TABLE 2

| Component | A (wt %) | B (wt %) |
| --- | --- | --- |
| ABS Resin (Dow Magnum ® PG-914) | 64.9 | 63.9 |
| Impact Modifier; Polychloroethylene (Tyrin ® 3611 of Dow Chemical Co.) | 13.1 | 13.1$^a$ |
| Impact Modifier; Styr/But/Styr Block Copolymer (Shell Kraton ® D1102) | 5.0 | 5.0$^a$ |
| Flame Retardant; Decabromodiphenyl Ethane (Ethyl Corp.) | 12.5 | 12.5$^a$ |
| Synergist; Sb$_2$O$_3$ | 4.0 | 4.0 |
| Processing Aid; Zinc Stearate | | 0.5$^a$ |
| Stabilizer; Dibutyltin Maleate (Thermolite ® 13 of Atochem No. Am.) | 0.5 | 1.0$^a$ |
| IZOD Impact Strength (ft-lb/in notch) | 4.8 ± 0.2 | 9.0 ± 0.4 |

$^a$component of masterbatch

The data in Example 2 illustrate the improvement in IZOD impact strength of the formulated ABS resin brought about by replacing some of the ABS resin with a styrene/butadiene/styrene block copolymer; i.e., an increase in the IZOD impact strength from 3.6±0.1 in Ex. 1 A to 4.8±0.2 ft-lb/in notch. Moreover, the data illustrate the surprising increase in IZOD impact strength which occurs when the styrene/butadiene/styrene block copolymer is part of the masterbatched ingredients; i.e., from 4.8±0.2 to 9.0±0.4 ft-lb/in notch.

In Example 3, the effects of removing the impact modifying resins, one at a time, from the masterbatch is illustrated.

EXAMPLE 3

In both A and B the components were combined as explained in Example 1 B.

TABLE 3

| Component | A (wt %) | B (wt %) |
| --- | --- | --- |
| ABS Resin (Dow Magnum ® PG-914) | 63.9 | 63.9 |
| Impact Modifier; Polychloroethylene (Tyrin ® 3611 of Dow Chemical Co.) | 13.1$^a$ | 13.1 |
| Impact Modifier; Styr/But/Styr Block Copolymer (Shell Kraton ® D1102) | 5.0 | 5.0$^a$ |
| Flame Retardant; Decabromodiphenyl Ethane (Ethyl Corp.) | 12.5$^a$ | 12.5$^a$ |
| Synergist; Sb$_2$O$_3$ | 4.0 | 4.0 |
| Processing Aid; Zinc Stearate | 0.5$^a$ | 0.5$^a$ |
| Stabilizer; Dibutyltin Maleate (Thermolite ® 13 of Atochem No. Am.) | 1.0$^a$ | 1.0$^a$ |

TABLE 3-continued

| Component | A (wt %) | B (wt %) |
|---|---|---|
| IZOD Impact Strength (ft-lb/in notch) | 5.8 ± 0.2 | 7.6 ± 0.3 | a component of masterbatch

When the components were combined without master batching, i.e., Example 2 A, the IZOD impact strength was 4.8±0.2 ft-lb/in notch. Although excluding either impact modifier resin from the masterbatch affects IZOD impact strength adversely, this affect is most pronounced when the styrene/butadiene/styrene block copolymer is left out of the masterbatch.

It will be evident to those skilled in the art that considerable variation in the specific nature and relative amounts of the components of the formulated ABS resin of this invention, as well as in the manner in which those components are combined is possible within the contemplation of this invention and that the invention is limited only by reference to the following claims:

What is claimed is:

1. A method for enhancing the impact resistance of a flame retarded formulated ABS resin, which resin includes at least about 50 wt % ABS resin, about 5-30 wt % halogenated flame retardant, up to about 6 wt % flame retardant synergist, and about 8-38 wt % polymeric impact modifier, which method comprises master batching the flame retardant and polymeric impact modifier, dry-blending the masterbatch with the ABS resin and the flame retardant synergist and extruding the resultant blend to form the formulated ABS resin.

2. The method of claim 1 wherein said polymeric impact modifier is selected from one or more of the group consisting of styrene/butadiene/styrene triblock copolymers, styrene/isoprene/styrene triblock copolymers, styrene/butadiene diblock copolymers, polycaprolactone, functionalized ethylene/propylene copolymers, and poly(haloolefins).

3. The method of claim 2 wherein said polymeric impact modifier comprises polychloroethylene together with a styrene/butadiene/styrene triblock copolymer.

4. The method of claim 1 wherein said flame retardant synergist is selected from one or more of the group consisting of metal oxides, hydroxides, and silicates, boron compounds, and ferrocene.

5. The method of claim 4 wherein said flame retardant synergist is antimony trioxide.

6. The method of claim 1 wherein said halogenated flame retardant is selected from one or more of tetrahalobisphenol A, N,N'-bis(tetrahalophthalimide), ethylenebis(tetrahalophthalimide), halogenated polystyrene, pentahalobenzyl acrylate, and bis-halophenyl compounds of the structural formula

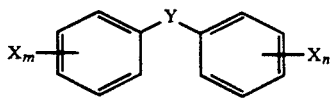

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

7. The method of claim 6 wherein each X is bromine and m and n are 4 or 5.

8. The method of claim 6 wherein said flame retardant is selected from decabromodiphenyloxide, decabromodiphenyl ethane, 1,2-bis(tribromophenoxy)ethane, decabromodiphenyl amine, and pentabromobenzyl acrylate and mixtures thereof.

9. The method of claim 7 wherein said flame retardant is decabromodiphenyl ethane.

10. The method of claim 1 wherein said impact modifier and flame retardant are masterbatched.

11. A flame retarded formulated ABS resin comprising:
(a) a masterbatch containing (i) about 5-30 wt % halogenated flame retardant and (ii) about 8-38 wt % polymeric impact modifier;
(b) at least about 50 wt % ABS resin; and
(c) up to about 6 wt % flame retardant synergist; the wt % of each constituent being based upon the total weight of the flame retarded formulated ABS resin, wherein test bars derived from the flame retarded formulated ABS resin have an enhanced IZOD impact strength, as measured by ASTM D 256, which is greater than the IZOD impact strength of test bars derived from a blended combination of (a) (i), (a) (ii), (d), and (c) without initially forming a masterbatch of (a) (i) and (a) (ii).

12. The resin of claim 11 wherein said polymeric impact modifier is selected from one or more of the group consisting of styrene/butadiene/styrene triblock copolymers, styrene/isoprene/styrene triblock copolymers, styrene/butadiene diblock copolymers, polycaprolactone, functionalized ethylene/propylene copolymers, and poly(haloolefins).

13. The resin of claim 12 wherein said polymeric impact modifier comprises polychloroethylene together with a styrene/butadiene/styrene triblock copolymer.

14. The resin of claim 11 wherein said flame retardant synergist is selected from one or more of the group consisting of metal oxides, hydroxides, and silicates, boron compounds, and ferrocene.

15. The resin of claim 14 wherein said flame retardant synergist is antimony trioxide.

16. The resin of claim 11 wherein said halogenated flame retardant is selected from one or more of tetrahalobisphenol A, N,N'-bis(tetrahalophthalimide), ethylenebis(tetrahalophthalimide), halogenated polystyrene, pentahalobenzyl acrylate, and bis-halophenyl compounds of the structural formula

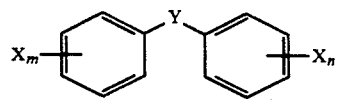

in which each X is selected independently from chlorine and bromine; m and n can be the same or different and can range from 1 to 5; and Y is selected from oxygen, alkylene, —NR— (where R is selected from hydrogen and hydrocarbyl), alkylenedioxy, aryldioxy, and a chemical bond.

17. The resin of claim 16 wherein each X is bromine.

18. The resin of claim 17 wherein m and n are 4 or 5.

19. The resin of claim 16 wherein said flame retardant is selected from decabromodiphenyloxide, decabromodiphenyl ethane, 1,2-bis(tribromophenoxy)ethane, decabromodiphenyl amine, and pentabromobenzyl acrylate and mixtures thereof.

20. The resin of claim 19 wherein said flame retardant is decabromodiphenyl ethane.

* * * * *